2,989,678
Patented June 20, 1961

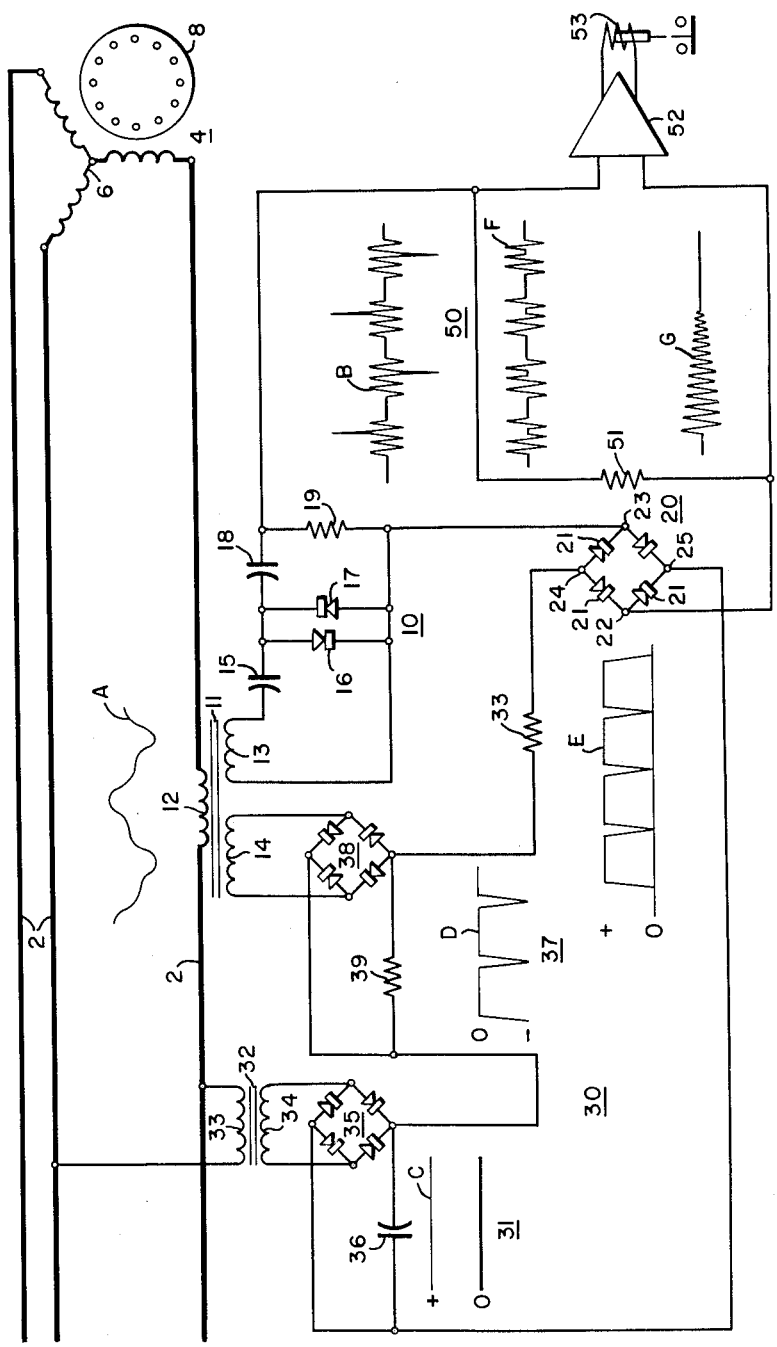

2,989,678
SPEED SENSING CIRCUITS

Willson C. Swartout, Elsmere, Del., assignor to Westinghouse Electric Corporation, East Pittsburgh, Pa., a corporation of Pennsylvania
Filed Dec. 17, 1959, Ser. No. 860,181
8 Claims. (Cl. 318—461)

The invention relates generally to speed sensing circuits and more particularly to a static subsynchronous speed sensing circuit for induction motors under plugging conditions.

Many conventional speed sensing circuits require moving parts which are a continual source of maintenance and adjustment. Such circuits are adversely affected by corrosive or extreme moisture conditions and are subject to fouling by dirt or dust. Sometimes physical attachment of the speed sensing circuit to the motor is necessary but may not be convenient.

An object of the present invention is to provide a speed sensing circuit which will be compact, light in weight, and reliable through the use of static devices requiring little or no maintenance.

Another object of the present invention is to provide a speed sensing circuit for an electric motor with no attachments to the motor.

Another object of the invention is to provide a speed sensing circuit for an electric motor capable of sensing the rotor harmonic content reflected from the machine.

Further objects and advantages of the present invention will be readily apparent from the following detailed description, taken in conjunction with the sole figure which is an electrical schematic diagram of an illustrative embodiment of the invention and includes oscilloscope tracings of the voltage waveform at selected points in the circuit.

The speed sensing circuit is illustrated connected to the power lines 2 leading to the motor 4 shown as a squirrel-cage motor having a stator winding 6 and rotor 8. The static speed sensing circuit generally comprises a differentiating circuit 10 which double differentiates the current flow in the power lines 2, a gating circuit 20, and a control circuit 30 for providing a synchronized gating signal to the gating circuit 20. The gating circuit 20 operatively connects the differentiating circuit 10 and the control circuit 30 to an output circuit 50 so that the presence of the gating signal allows an output from the output circuit 50, which output has a magnitude and frequency functionally related to the speed of the motor. The output is then amplified at 52 and detected by the sensing relay 53.

The double differentiating circuit 10 is connected to the power lines 2 through a current transformer 11 having a primary winding 12 serially connected in the power line 2 and a first secondary winding 13 and a second secondary winding 14. The secondary winding 13 provides a sampling of the line current flow in the power lines 2 which is initially differentiated by the capacitor 15 serially connected with paralleled rectifiers 16 and 17 across the secondary winding 13. The rectifiers 16 and 17 are poled in opposite directions and functionally operate as a resistive element. A capacitor 18 and resistor 19 connected across the paralleled rectifiers 16 and 17 again differentiate the voltage across the rectifiers 16 and 17 so that the resultant output appears across the resistor 19.

A full wave 60-cycle oscilloscope current trace A illustrates the current flow in the power lines 2. The current supplied to the electric motor is a very pure sinusoidal wave. Any distortion in the line current is the result of reflected currents from the rotor 8 as it rotates with respect to the stator winding 6. The current transformer 11 is selected to be highly inductive thereby tending to hold the higher frequencies so that any resulting distortion will appear across the transformer 11. The pure 60-cycle waveform and the harmonic distortions are double differentiated by the circuit 10 with the resultant voltage output trace B appearing across the resistor 19. The voltage output trace B comprises two components, namely the 60-cycle spikes for each half cycle of the fundamental frequency component of the incoming current to the electric motor, and the rotor harmonic currents reflected from the motor back to the power lines 2. The voltage trace B is representative of the motor operating at synchronous speed. If the motor were at standstill, the tracing B would contain no rotor harmonic content but would merely show the 60-cycle spikes. Therefore, to form the output signal across the resistor 19 into useful information which can be detected by the sensing relay 53 a rejection network is provided which will eliminate the 60-cycle spikes shown in the trace B but allow the rotor harmonics to pass to the amplifier 52 and relay 53. Hence, a gating circuit 20 is provided to block current flow in the output circuit 50 at the precise time a 60-cycle spike is due to appear across the resistor 19.

The gating circuit 20 comprises rectifying elements 21 connected in a bridge arrangement having output terminals 22 and 23 and input terminals 24 and 25. The output circuit 50 comprises the resistor 19, the output terminals 22 and 23, and an output resistor 51 connected in series-circuit relationship. The rectifier elements 21 are poled to block current flow in either direction of the output circuit 50 in the absence of a gating signal to the control terminals 24 and 25. The output voltage appearing across the output resistor 51 is amplified by the amplifier 52 and connected to the sensing relay 53 which relay 53 may perform a variety of functions to be outlined hereinafter.

The control circuit 30 for providing a gating signal to the gating circuit 20 to allow current flow in the output circuit 50 comprises a direct current static generating circuit 31 and a synchronized static pulse generator 32 serially connected with a dropping resistor 33 to the gating circuit 20.

The direct current gating generator 31 comprises a potential transformer 32 having a primary winding 33 connected across the power lines 2 and a secondary winding 34 which is connected across a single phase full-wave bridge arrangement shown at 35. The output from the bridge arrangement 35 is filtered by the capacitor 36 and provides a direct current gating signal, C, to the gating circuit 20, which direct current gating signal is of a polarity to cause conduction of the rectifier elements 21.

As long as a gating signal of proper polarity appears across the control terminals 24 and 25, the current due to the voltage appearing across the resistor 19 in the differentiating circuit 10 will be allowed to pass through the gating circuit 20 and appear across the output resistor 51. With all the rectifying elements 21 conducting, current flow will divide in the two parallel branches to effectively allow current flow in the output circuit 50. When the direct current gating signal disappears or reverses in polarity, the rectifier elements 21 are nonconducting and, therefore, the signal from the resistor 19 cannot pass through the gating circuit 20 and hence does not appear across the resistor 51 in the output circuit 50.

To reduce the direct current gating signal appearing across the control terminals 24 and 25 to zero, the synchronized static pulse generator 32 is connected in the control circuit 30 to provide pulses of opposite polarity to the direct current gating signal. The synchronized pulse generator 37 comprises a single phase full wave rectifier bridge arrangement 38 connected across the secondary winding 14 and provides a pulsating direct current, D, across the resistor 39 having a polarity opposite to the signal from the direct current gating generator 31.

The current transformer 11 is selected with the secondary windings 13 and 14 so that the pulses D are synchronized with the 60-cycle line current.

Hence, the gating signal appearing across the control terminals 24 and 25 comprises the direct current trace C from the direct current gating generator 31 plus the pulse trace D from the synchronized pulse generator 37 so that the resultant gating signal trace E appearing across the control terminals 24 and 25 causes conduction of the rectifier elements 21 whenever the pulse signal D is absent. The gating signal E can be seen to be the result of mixing the line current pulses resulting from the pulse generator 37 and the direct current voltage resulting from the direct current generator 31. The gating signal E will turn off or approach zero at the precise time that a 60-cycle spike appearing across the resistor 19 from the differentiating circuit 10 is due to appear. As a result, the 60-cycle spikes appearing across the resistor 19 are blocked from current flow through the output circuit 50 by the gating circuit 20 and only the rotor harmonic content is allowed across the output resistor 51. A representative trace of the harmonic content appearing across the output resistor 51 is illustrated at F. The rotor harmonic content is then taken from the output resistor 51 and passed into the amplifier 52 or a variety of other electronic circuitry which raises the power level of the signal so that it is powerful enough to hold a relay 53 or other device energized.

The tracing G is taken on a time base of about three seconds and illustrates how the harmonic signals F decay as the rotor plugs to zero revolutions per minute. The rotor harmonic content can be seen to completely vanish across the output resistor 51 at 30% to 40% of synchronous speed. Thus, it is readily apparent that the electric motor may be braked by plugging from 100% to about 40% of synchronous speed and dynamic braking may be applied for the remaining 40% of synchronous speed. Therefore, the advantages of dynamic braking are obtained with considerable cost savings. Relatively inexpensive plugging of the motor can be had in the higher speed ranges and upon decay of the harmonic components shown by the trace G at approximately 40% of synchronous speed, a dynamic braking arrangement may be applied which need only have a capacity rating of approximately 20% of a dynamic braking system required to stop the motor from synchronous speed. For high inertial loads or large horsepower motors, a considerable cost savings is realized by the use of the present invention.

While the present invention has been shown and described with a particular degree of exactness for the purpose of illustration, it is to be understood that all equivalents, alterations and modifications within the spirit and scope of the invention are herein meant to be included.

I claim as my invention:

1. A speed sensing circuit for an electric motor adapted to be connected to an alternating current power source by connecting means; said sensing circuit comprising output means, first means operably connected to said connecting means for providing a spike signal for each half cycle of the incoming current to the motor through said connecting means and providing an alternating current signal responsive to the reflected currents from the motor through said connecting means, gating circuit means, second means for providing a gating signal, said gating circuit means operatively connecting said first means and said second means to said output means so that during said gating signal the output from said output means has a magnitude and frequency functionally related to the speed of said motor, and means operably connected to said connecting means for blocking said gating signal during each spike signal.

2. A speed sensing circuit for an electric motor adapted to be connected to an alternating current power source by connecting means; said sensing circuit comprising output means, first means operably connected to said connecting means for providing a spike signal for each half cycle of the fundamental frequency component of current through said connecting means and an alternating current signal responsive to the harmonic frequency component of current through said connecting means, gating circuit means, second means for providing a gating signal, said gating circuit means operatively connecting said first means and said second means to said output means so that during said gating signal the output from said output means has a magnitude and frequency functionally related to the speed of said motor, and means operably connected to said connecting means for blocking said gating signal during each spike signal.

3. A speed sensing circuit for an electric motor adapted to be connected to an alternating current power source by connecting means; said sensing circuit comprising output circuit means, rectifier means including output terminals and control terminals, said output circuit means connected in circuit relation with said output terminals, said rectifier means poled to block current flow in either direction of said output circuit means in the absence of a gating voltage, control means connected to said control terminals for applying a gating voltage of predetermined polarity across said control terminals causing conduction through said rectifier means allowing current flow in either direction of said output circuit means, differentiating means operably connected to said connecting means for providing a spike signal to said output circuit means for each half cycle of the fundamental component of current through said connecting means and an alternating current signal to said output circuit responsive to the component of harmonic frequency of current through said connecting means, and means operably connected to said connecting means for blocking application of said control voltage during each spike signal.

4. A speed sensing circuit for an electric motor adapted to be connected to an alternating current power source by connecting means; said sensing circuit comprising output circuit means, differentiating means operably connected to said connecting means for providing to said output circuit means a spike signal for each half cycle of the fundamental frequency component of current through said connecting means and an alternating current signal responsive to the harmonic frequency component of current through said connecting means; gating circuit means comprising a plurality of rectifier elements connected in a bridge circuit arrangement having output terminals and control terminals; gating signal means for providing a gating signal to said control terminal; said output terminals of said gating circuit connected in circuit relationship with said output circuit means, said rectifier elements poled to allow current flow between said control terminals in response to a gating signal of predetermined polarity, said rectifier elements poled to allow current flow through said output terminals only in response to current flow between said control terminals, the current flow through the output circuit means having a magnitude and frequency functionally related to the speed of said motor; and means operably connected to said connecting means for blocking said gating signal during each spike signal.

5. A speed sensing circuit for an electric motor including a rotor and a stator, said stator adapted to be connected to an alternating current power source by connecting means; said speed sensing circuit comprising output means; first means comprising a current transformer having a primary winding and a secondary winding, said primary winding connected in series circuit relationship with said connecting means, a filtering network connected across said secondary winding for passage of reflected currents from said rotor as it rotates with respect to said stator and for passage of a spike signal for each half cycle of the incoming current to said stator through said connecting means; gating circuit means; second means for providing a gating signal; said gating circuit means operatively connecting said first means and said second means to said output means so that during said gating signal the output from said output means is only the reflected currents from said rotor; and means operably connected to said connecting means for blocking said gating signal during each spike signal.

6. A speed sensing circuit for an electric motor including a rotor and a stator, said stator adapted to be connected to an alternating current power source by connecting means; said speed sensing circuit comprising output means; first means comprising a current transformer having a primary winding and a secondary winding, said primary winding connected in series circuit relationship with said connecting means, a filtering network connected across said secondary winding for passage to said output means of reflected currents from said rotor as it rotates with respect to said stator and a spike signal for each half cycle of the incoming current to said stator through said connecting means; gating circuit means; second means for providing a constant direct current gating signal of predetermined polarity; means operably connected to said connecting means for blocking said gating signal during each spike signal; said gating circuit means operatively connecting said first means and said second means to said output means so that during said gating signal the output from said output means is only the reflected currents from said rotor.

7. A speed sensing circuit for an electric motor including a rotor and a stator, said stator adapted to be connected to an alternating current power source by connecting means; said speed sensing circuit comprising output circuit means; first means comprising a current transformer having a primary winding and a two portion secondary winding, said primary winding connected in series circuit relationship with said connecting means, a filtering network connected across a first portion of said secondary winding for passage to said output circuit means of reflected currents from said rotor as it rotates with respect to said stator and a spike signal for each half cycle of the incoming current to said stator through said connecting means; gating circuit means comprising a plurality of rectifier elements connected in a bridge circuit having output terminals and control terminals; said output terminals connected to said output circuit means; said rectifier elements poled to block current flow in said output circuit means in the absence of a gating signal to said control terminals; a direct current source of predetermined magnitude and polarity; rectifying means connected across a second portion of said secondary winding for providing a pulsating direct current signal of substantially the same magnitude but opposite polarity of said direct current source and having the same frequency as said spike signals, and circuit means for connecting said direct current source and said rectifying means in opposition across the control terminals of said gating circuit means.

8. A speed sensing circuit for an electric motor adapted to be connected to an alternating current power source by connecting means; said speed sensing circuit comprising output circuit means; gating circuit means connected in circuit relationship with said output circuit means to block current flow in either direction of said output circuit means; differentiating means operably connected to said connecting means for providing to said output circuit means a spike signal for each half wave of the fundamental frequency component of current through said connecting means and an alternating current signal responsive to the harmonic frequency component of current through said connecting means; means for providing a direct current signal of a predetermined polarity to said gating circuit means; said gating circuit means allowing current flow in either direction of said output circuit means in response to said direct current signal; and means operably connected to said connecting means for providing a pulse signal synchronized to occur with each said spike signal and having a polarity opposite to said direct current signal for blocking application of said direct current signal to said gating means during each said pulse signal, the current flow through said output circuit means having a magnitude and frequency functionally related to the speed of said motor.

No references cited.